United States Patent
Teixeira et al.

(10) Patent No.: US 12,180,889 B2
(45) Date of Patent: Dec. 31, 2024

(54) SYSTEM AND METHOD FOR STORING AND RECOVERING ENERGY USING COMPRESSED-GAS WITH RECOVERY LIQUID

(71) Applicant: IFP Energies nouvelles, Rueil-Malmaison (FR)

(72) Inventors: David Teixeira, Rueil-Malmaison (FR); Elsa Muller-Shernetsky, Rueil-Malmaison (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 0 days.

(21) Appl. No.: 18/038,776

(22) PCT Filed: Nov. 23, 2021

(86) PCT No.: PCT/EP2021/082604
§ 371 (c)(1),
(2) Date: May 25, 2023

(87) PCT Pub. No.: WO2022/117398
PCT Pub. Date: Jun. 9, 2022

(65) Prior Publication Data
US 2023/0417179 A1 Dec. 28, 2023

(30) Foreign Application Priority Data
Dec. 3, 2020 (FR) ..................... 2012637

(51) Int. Cl.
*F02C 6/00* (2006.01)
*F02C 1/04* (2006.01)
*F02C 6/16* (2006.01)

(52) U.S. Cl.
CPC .................. *F02C 6/16* (2013.01); *F02C 1/04* (2013.01); *F05D 2260/42* (2013.01)

(58) Field of Classification Search
CPC ........... F02C 6/16; F02C 1/04; F05D 2260/42
See application file for complete search history.

(56) References Cited

U.S. PATENT DOCUMENTS 4,347,706 A * 9/1982 Drost ........................ F02C 6/16
60/659
8,978,380 B2 * 3/2015 Kidd ........................ F02C 7/143
60/659

(Continued)

FOREIGN PATENT DOCUMENTS

CN 106677988 A * 5/2017 ............. F01D 15/10
FR 2993925 A1 1/2014

(Continued)

OTHER PUBLICATIONS

International Search Report and Written Opinion for PCT/EP2021/082604 dated Jan. 27, 2022; 12 pages.

*Primary Examiner* — Matthew T Largi
(74) *Attorney, Agent, or Firm* — Fitch, Even, Tabin & Flannery LLP

(57) ABSTRACT

The present invention is a compressed-gas energy storage and recovery system and method. The system comprises a compression line (1), an air storage means (1000) and an expansion line (2). According to the invention, the compression line (1) and expansion line (2) comprise a heat storage means (200, 201, 202) including heat storage particles. The expansion line comprises means (600, 601, 602) for injecting and mixing liquid in expansion line (2).

24 Claims, 8 Drawing Sheets

(56) References Cited

U.S. PATENT DOCUMENTS

| | | | | |
|---|---|---|---|---|
| 2011/0016864 A1* | 1/2011 | Wright | ............... | F02C 6/16 |
| | | | | 60/659 |
| 2011/0100010 A1* | 5/2011 | Freund | ............... | F02C 6/18 |
| | | | | 60/659 |
| 2011/0113781 A1* | 5/2011 | Frey | ............... | F01K 25/00 |
| | | | | 60/671 |
| 2014/0026584 A1* | 1/2014 | Naeve | ............... | F02C 7/143 |
| | | | | 60/727 |
| 2014/0360191 A1* | 12/2014 | Brunhuber | ............... | F01K 7/22 |
| | | | | 60/659 |
| 2016/0216044 A1 | 7/2016 | Narine et al. | | |
| 2016/0326958 A1* | 11/2016 | Kosamana | ............... | F02C 6/16 |
| 2021/0172372 A1* | 6/2021 | Briot | ............... | F01K 3/00 |

FOREIGN PATENT DOCUMENTS

| | | | |
|---|---|---|---|
| FR | 3074844 A1 | 6/2019 | |
| FR | 3074846 A1 | 6/2019 | |
| WO | 2016012764 A1 | 1/2016 | |
| WO | 2016079485 A1 | 5/2016 | |
| WO | WO-2019115120 A1 * | 6/2019 | ............ F01D 25/32 |

\* cited by examiner

SYSTEM AND METHOD FOR STORING AND RECOVERING ENERGY USING COMPRESSED-GAS WITH RECOVERY LIQUID

CROSS REFERENCE TO RELATED APPLICATIONS

Reference is made to PCT/EP2021/082604 filed Nov. 23, 2021, and French Application No. 2012637 filed Dec. 3, 2020, which are incorporated herein by reference in their entirety.

BACKGROUND OF THE INVENTION

Field of the Invention

The present invention relates to the field of energy storage and production by compression and expansion of gas and air.

Description of the Prior Art

While world energy objectives promote renewable energies over fossil energies, and their progressive proportion of in the energy mix, their variability remains their major drawback. To address this issue, energy storage appears to be the ideal solution. By storing the excess electricity generated during production peaks in order to use it when production is below demand, storage allows side-stepping the variability constraint and providing an initially non-existent continuity, or at least flexibility, to renewable energies. Thus, there is a need for energy storage methods, which will increase with the proportion of this type of energy in the world energy mix.

Many mature storage technologies currently exist already, such as for example mechanical storage such as pumped storage power stations using the hydropower produced by two water reservoirs at different elevations. During power storage, the water in the lower reservoir is pumped into the upper reservoir and stored at this elevation. When electricity demand increases, the water in the upper reservoir is sent back to the lower reservoir through a hydraulic turbine that generates electricity via a generator. Hydroelectric dams also work according to the same concept in that the dam holds back the water at a higher elevation upstream than downstream, and when the electricity demand increases, the dam releases the water that is run through hydraulic turbo generators producing electricity. Compressed-air energy storage (CAES) technology is a mechanical type solution. Other electrochemical technologies can also be used for energy storage, such as lithium-ion, lead-acid or nickel-cadmium batteries, or flow batteries using electrolytes.

Compressed-air energy storage (CAES) is a mature technology whose first plant was built in Germany in the late 1970s, storing 290 MW. The principle of CAES is to use the electricity produced and not consumed for compressing air. In order to avoid damage to the compressors, the heat resulting from compression is removed between each stage. The air compressed to medium or high pressure (40 bar to 300 bar) is sent to a natural storage site such as a salt cavern, a mine (salt, limestone, coal), or to an artificial storage site until the energy discharge phase. During the electricity production phase, the stored air is extracted from the storage site and expanded in turbo generators. For basic CAES systems such as the one of the late 1970s, the compressed air was used for feeding gas turbines (also referred to as combustion turbines). These turbines burn natural gas via a combustion chamber in the presence of compressed air so as to produce very hot combustion gas (500° C.-800° C.) expanded to generate electricity. The CAES process has an energy efficiency of the order of 50%.

A variant of CAES is the adiabatic compressed-air energy storage (ACAES) method. The main difference with the original CAES method is that the heat resulting from compression is no longer removed between each stage. It is stored in order to heat the air upstream from the turbines in the electricity production phase. This reuse of the thermal energy internal to the process allows the efficiency of ACAES to reach about 70%. Cooling of the air in a compression phase can be done via indirect-contact exchange in a heat exchanger with a heat transfer fluid. The hot heat transfer fluid is then stored and thermally insulated to the maximum to yield its heat to the air during the expansion phase. It can also be done via direct-contact exchange between the air and a thermal storage mass based on sensible heat or by use of phase-change materials. In both cases, the heat from the air is stored directly in the mass, either within the material or by carrying out a material phase change. During the expansion phase, the cold air is reinjected into the thermal storage mass and, by direct contact, the air warms up by capturing the heat of the material or by allowing the reverse phase change releasing the heat. This air cooling can then induce water condensation if the air has a certain humidity level. This condensed water then needs to be extracted from the air circuit so as not to damage the downstream compressors.

A first solution for limiting damage to the compressors is to extract the water from the compression line by using a gas/liquid separator provided at each compression stage. FIG. 1 schematically illustrates a block diagram, such as an ACAES system and method. This figure shows the phase of energy storage by compression of a gas, and the phase of energy production by expansion of a gas. The system according to the prior art is comprised of a compression line (1) including one or more compression stages (3) according to the air pressure to be reached and to suppliers' recommendations. In the embodiment illustrated, compression line (1) comprises three compression stages (3). Each compression stage (3) comprises a compression means (100, 101, 102), which is a compressor. Compressor (100) is a low-pressure compressor, compressor (101) is a medium-pressure compressor, and compressor (102) is a high-pressure compressor. The gas used (10) in the method illustrated is ambient air having a water saturation related to the temperature and pressure thereof. During the energy storage phase, the air is compressed in compression line (1) and subsequently sent to a compressed air storage (1000) suited for high pressures. Heat storage and recovery apparatus (200, 201, 202) are arranged after each compressor (100, 101, 102) of each compression stage (3) to cool the hot compressed air at the compression outlet while storing the thermal energy. Heat storage and recovery apparatus (200) is suited for low pressure, heat storage and recovery means (201) is suited for medium pressure, and heat storage and recovery (202) is suited for high pressure. Cooling apparatus (300, 301, 302) can be arranged behind heat storage and recovery (200, 201, 202) if necessary in order to complete cooling of the compressed air before the next compression stage or prior to storage thereof. Once the air cooled and before the next compression stage, the condensed water from the humidity in the air is extracted from the air compression stream by gas/liquid separators (400, 401, 402) to obtain air without any trace of liquid water at the compressor inlet. This water condensation can take place in the heat storage and recovery apparatus (200, 201, 202) and/or in the cooling apparatus (300, 301, 302). During the energy production phase, the compressed air is expanded via one or more turbines (700, 701, 702) or expansion stages, according to suppliers' recommendations, in order to produce electricity via generators, not shown in the diagram. Turbine (702) is a low-pressure turbine, turbine (701) is a medium-pressure turbine and turbine (700) is a high-pressure turbine. For this system and this method, the condensed water is just extracted, the associated energy is therefore lost.

Other systems and methods for compressed-gas energy storage and recovery consider recovery of the energy contained in the condensation water.

For example, patent application FR-3,074,844 (WO-2019/115,121) discloses an improved ACAES system and method with reinjection of the condensates resulting from air cooling into the water used as heat transfer fluid, allowing storage of the heat extracted from the air between each compression stage. However, this system and this method are difficult to implement due to the heat transfers between the different water temperatures. This technology is based on a counter-current direct-contact exchanger between the moist air to be cooled and the heat transfer fluid warming up. During cooling of the air, humidity appears and is transported by the heat transfer fluid. Since this fluid flows counter-current, the humidity again meets hot air and therefore again evaporates. Water accumulation occurs in the exchanger. Moreover, this system is difficult to implement due to the circulation of a heat transfer fluid, which requires pipes, pumps and additional storage which cause space constraints.

Patent application WO-16,012,764 discloses an ACAES method wherein the humidity from the air is condensed upstream from the air storage in a compression stage, stored and reinjected into the air in an expansion stage at the air storage outlet. However, this method does not allow protection of the compressors of the various compression stages by limiting the water flowing therethrough. In addition, this configuration does not enable optimization of the energy recovered from the condensed water. Moreover, this system is difficult to implement due to the circulation of a heat transfer fluid, which requires pipes, pumps and additional storage, and also causes space constraints.

Patent application WO-16,079,485 discloses an ACAES method in which the humidity of the air is condensed upstream from the air storage in a compression storage, stored and reinjected into the air in expansion storage at the outlet of the air storage. However, this method does not allow protection of the compressors of the various compression stages by limiting the water flowing therethrough. In addition, this configuration does not enable optimization of the energy recovered from the condensed water. Moreover, this system is difficult to implement due to the circulation of a heat transfer fluid, requiring pipes, pumps and additional storage, and also has space constraints. This system also requires a combustion turbine in expansion and a Rankine cycle producing electricity whereas it is desired to store energy. Thus, many equipments are used producing a degraded efficiency.

SUMMARY OF THE INVENTION

The present invention relates to a compressed-gas energy storage and recovery system and method, allowing the efficiency of the system and of the method to be optimized, while limiting the space required by the system resulting in simplifying the operation thereof. The present invention therefore relates to a compressed-gas energy storage and recovery system and method, comprising a compression line, an air storage and an expansion. According to the invention, the compression line and the expansion line comprise heat storage including heat storage particles. In addition, the expansion line comprises injecting and mixing of liquid in the expansion line. Thus, through the injection of liquid, the gas flow rate is increased in each expansion stage, which increases the efficiency of the system and of the method to be increased. Moreover, through the use of heat storage in heat storage particles, the system and the method are simple and suitable (no heat transfer fluid is used in the heat storage).

The invention relates to a compressed-gas energy storage and recovery system comprising:
  a gas compression line with at least two successive compression stages, each compression stage comprising a compressor, and a heat storage and recovery located downstream from the compressor, in the direction of flow of the gas;
  at least one compressed gas storage located at the outlet of the gas compression line for storing the compressed gas;
  a gas expansion line for expanding the compressed gas stored in the compressed gas storage, the gas expansion line comprising at least two successive expansion stages, each expansion stage comprising an expansion stage and pipes configured to circulate the compressed gas in at least one of the heat storage and recovery of the compression stages to heat the compressed gas; and
  the heat storage and recovery comprise heat storage particles, and each expansion stage comprises a liquid delivery, the liquid delivery of the liquid being provided upstream, in the direction of flow of the gas, from the heat storage.

According to an embodiment, each compression stage comprises a means for separating the gas and a liquid.

Advantageously, for each compression stage, the gas/liquid separation means is located downstream from the heat storage and recovery, in the direction of flow of the gas.

Preferably, the system comprises liquid storages for storing the liquid at the outlet of the gas/liquid separator, and the delivery delivers the liquid of the liquid storage.

According to an embodiment option, the compression line comprises as many compression stages as the expansion line comprises expansion stages. Each heat storage and recovery of a compression stage is used in the corresponding expansion stage.

Advantageously, the compression line and the expansion line comprise three stages respectively.

According to an embodiment, at least one compression stage comprises cooling downstream from the heat storage and recovery, in the direction of flow of the gas, preferably, the cooling means comprises an air cooler.

According to an aspect, the expansion line comprises at least one additional heat exchanger located between the gas at the outlet of the expansion line and the compressed gas.

According to a feature, the at least one additional heat exchanger is located in the first expansion stage, in the direction of flow of the gas.

Advantageously, the expansion line comprises two additional heat exchangers located in two expansion stages.

According to an implementation, the at least one additional heat exchanger is located between the delivery of the liquid and the heat storage and recovery, in the direction of flow of the gas.

Furthermore, the invention relates to a compressed-gas energy storage and recovery method comprising at least the following steps:

in energy storage phase:
a) successively compressing at least twice a gas in a compression line comprising at least two compression stages, each compression stage comprising at least one compressor;
b) after each compression step, recovering the heat of the compressed gas in at least one heat storage and recovery devices;
c) storing the cooled compressed gas in at least one compressed gas storage;

in energy recovery phase;
d) circulating the compressed gas leaving the compressed gas storage in an expansion line comprising at least two successive expansion stages, and in each expansion stage, heating the compressed gas by circulation in one of the heat storage and recovery devices using the heat stored during the compression step, then expanding the heated compressed gas in an expansion stage, for this method, the heat is stored in heat storage particles, and before each expansion step, liquid is fed into the compressed gas prior to the step of heating the gas.

According to an embodiment, after each compression step, the gas and a liquid present in the gas are separated.

Advantageously, the separated liquid is stored, and is fed into the compressed gas is the stored liquid.

According to an implementation, as many compression steps as there are expansion steps are carried out, and the means for storing and recovering the heat in each step b) is used for heating the compressed gas of the corresponding expansion step.

According to an aspect, after each heat recovery step, the compressed gas at the outlet of the heat storage and recovery is cooled in a cooler prior to sending the gas to the next compression step or to the compressed gas storage.

According to a feature, prior to at least one expansion step, the gas is heated by at least one additional heat exchanger with the gas at the outlet of the expansion line.

Advantageously, the at least one additional heat exchanger is carried out for the first expansion step, in the direction of flow of the gas.

According to an implementation, two additional heat exchangers are carried out for two expansion steps.

According to an embodiment, the additional heat exchanger is carried out after the step of feeding the stored liquid into the compressed gas.

BRIEF DESCRIPTION OF THE DRAWINGS

Other features and advantages of the system and of the method according to the invention will be clear from reading the description hereafter of embodiments given by way of non-limitative example, with reference to the accompanying figures wherein.

DETAILED DESCRIPTION OF THE EMBODIMENTS OF THE INVENTION

Figure 1:
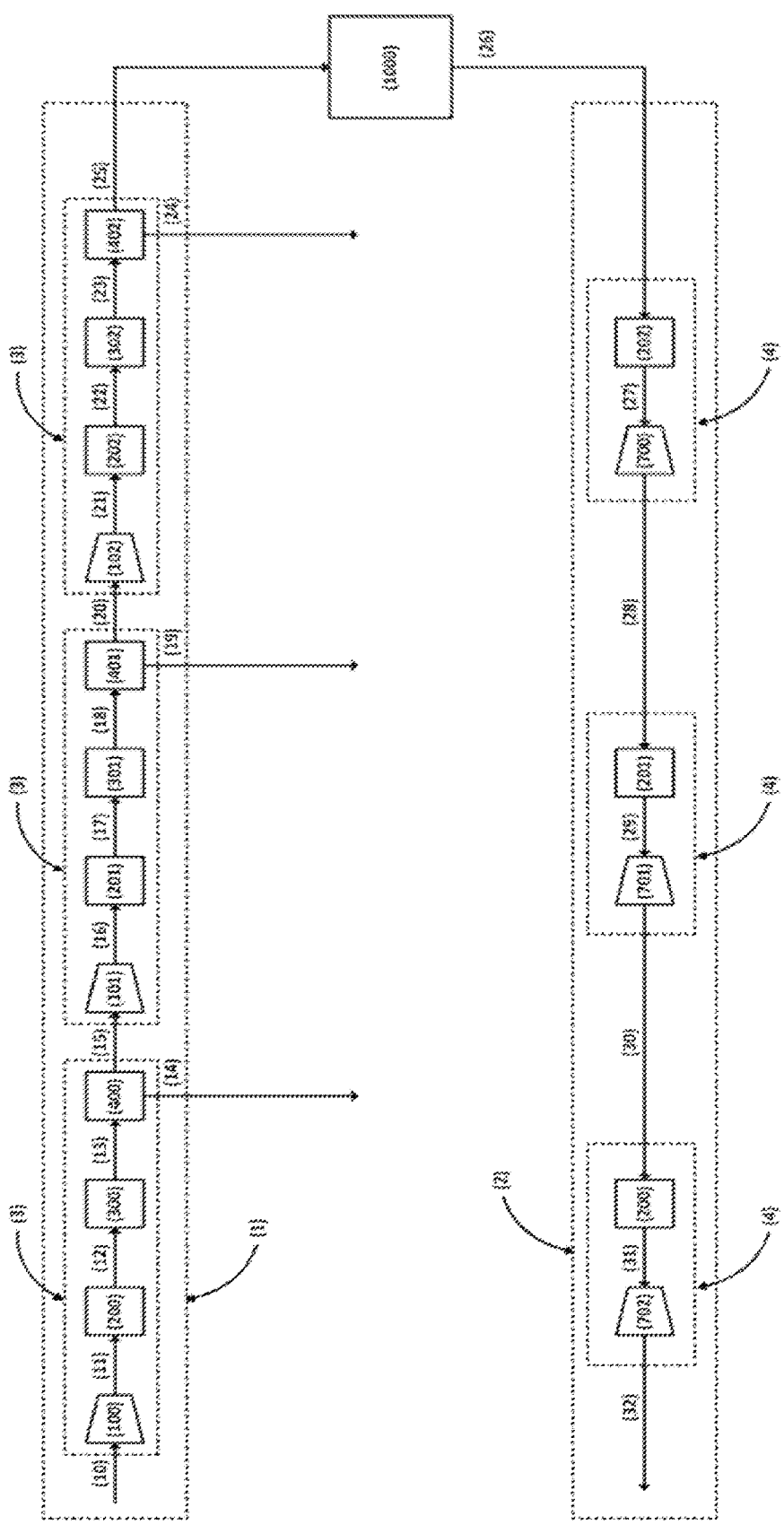
FIG. 1, already described, illustrates a compressed-gas energy storage and recovery system and method according to the prior art.

The present invention relates to a compressed-gas energy storage and recovery system and method.

In the present invention, the terms "upstream", "downstream", "at the inlet", "at the outlet", "before", "after", are defined by the direction of flow of the gas, during the energy storage phase (compression phase) and during the energy recovery phase (expansion phase) respectively.

The system according to the invention comprises:
a gas compression line (a compression line is understood to be the gas line connecting the gas inlet to the compressed gas storage through at least two successive compressors), with at least two successive compression stages (in series), each compression stage comprises: a gas compressor (compressor) allowing the pressure of the gas to be increased for storage; the compression can be axial or centrifugal compressors, or of any other technology; and a heat storage and recovery arranged downstream from the compressor, for storing the heat generated by compression and decreasing the gas temperature before the next compression stage or before the compressed gas storage;

at least one compressed gas storage for storing the compressed gas at the outlet of the compression line for later use, the compressed gas storage can be a natural cave such as a salt cavern, a former mine or an aquifer, or an artificial storage site;

a gas expansion line (an expansion line is understood to be the gas line connecting the compressed gas storage means to the gas outlet through at least one expansion stage), with at least two successive expansion stages (in series), each expansion stage comprising: at least one compressed gas expansion stage for generating energy, for example a turbine that can be coupled to a generator; and pipes for circulating the gas in one of the storages of the compression line, for recovering the stored heat and to increase the gas temperature in order to increase the energy produced in the expansion stage.

According to the invention, the heat storage and recovery comprises heat storage particles. Thus, heat exchange occurs through direct exchange between the gas and a material so that the material remains in the heat storage and recovery. In other words, there is no heat storage particle circulation. Therefore, it is not necessary to have a dedicated system comprising storage tanks for a heat transfer fluid, pumping means and dedicated pipes. For example, the material can be stones, concrete, gravel, phase change material (PCM) balls, possibly encapsulated, preferably with a solid-liquid phase change, zeolites or any similar material.

Additionally, each expansion stage comprises a liquid delivery device. The liquid delivery device allows mixing between the gas of the expansion line and the liquid. Thus, through water injection, the gas flow rate is increased in each expansion stage, which allows the efficiency of the system and of the method to be increased. The liquid delivery and mixing are provided in the expansion line upstream from the heat storage means, thus, the reinjected liquid and water mixture is heated in the heat storage means, which allows vaporization of the liquid, and thus only gas is fed into the expansion stage.

According to an embodiment of the invention, the gas can be air. It may be air taken from the ambient environment. As a variant, it may comprise other gases.

According to an aspect of the invention, the liquid is water. It may notably be the humidity present in the gas, in particular when the gas is air. As a variant, it may comprise other liquids.

According to an embodiment, each compression stage can comprise a gas/liquid separator allowing extraction of the liquid present in the gas, notably as a result of condensation of the water present in the gas, and eliminating liquid traces likely to be contained in the gas after cooling thereof, which might damage the system, notably the compressor.

Furthermore, the system and the method can comprise liquid storage for storing the liquid extracted from the compression line. For example, one liquid storage per compression stage (therefore per gas/liquid separator) can be provided. Thus, the liquid can be stored at different pressures. Advantageously, the liquid delivery allows delivery of the liquid flowing from the liquid storage, thus making it possible to use a liquid recovered from condensation in the compression line.

According to an embodiment of the invention, the gas/liquid separation can be arranged downstream from the heat storage and recovery. It is thus possible to extract the liquid formed by condensation in the heat storage and recovery.

Alternatively, the gas/liquid separation can be arranged upstream from the compression, or between the compression and the heat storage and recovery.

Advantageously, the compression line and the expansion line can comprise the same number of stages. In other words, the number of compression stages and the number of expansion stages can be identical. This provides a "symmetrical" design of the compression and expansion lines, with notably similar operating pressures and temperatures, which promotes heat exchanges in the heat storage and recovery, and allows reinjection of the liquid into an expansion stage that corresponds to the corresponding compression stage. Thus, the system and the method are simplified.

For this embodiment, the number of compression and expansion stages can range between two and six, preferably between three and five. For example, the number of compression and expansion stages can be three, which enables good temperature and pressure management while keeping a simple design.

As a variant, the number of compression stages and the number of expansion stages can be different. For this embodiment, at least part of the heat storage and recovery, and at least part of the liquid delivery, can be pooled.

In addition, at least one compression stage can comprise a cooling apparatus/means. This cooler can be arranged downstream from the heat storage and recovery. This cooler provides more significant cooling of the gas, which allows the dimensions of the heat storage and recovery to be reduced. This cooling can be air coolers or heat exchangers (shell/tube, plate, spiral or other suitable technologies) exchanging with a heat transfer fluid that can be water, propane, butane or any other suitable coolant for the required cooling. The cooling can be suited to the pressure of the incoming air exchanging with each one of them. The cooling is not involved in the energy recovery phase.

For this embodiment, the gas/liquid separation can be arranged downstream from the cooler. It is thus possible to extract the liquid formed by condensation in the heat storage and recovery, and in the cooling.

According to an embodiment, the expansion line can comprise at least one additional heat exchanger, between the gas at the expansion line outlet and the compressed gas. Thus, the hot gas at the expansion line outlet is cooled, and the compressed gas in the expansion line can be heated. It is thus possible to recover lost thermal energy, and thereby to decrease the compressed gas heating needs, which allows reduction of the dimensions of at least one heat storage and recovery (and therefore the cost of the heat storage and recovery).

According to an implementation of this embodiment, the additional heat exchanger can be located in the first expansion stage. The "first expansion stage" is understood to be the first expansion stage traversed by the gas in the expansion line. In other words, the first expansion stage is next to the compressed gas storage. Thus, the heat of the gas at the expansion line outlet is used to heat the cooler gas at the compression storage outlet, which allows reduction of the dimensions of the heat storage and recovery of the first expansion stage, which is the heat storage and recovery with the highest pressure constraints, and therefore the most expensive heat storage and recovery.

As a variant, the additional heat exchanger can be arranged in an expansion stage contained between the first and the last expansion stage.

According to an aspect of this embodiment, the expansion line can comprise two additional heat exchangers located in two different expansion stages. It is thus possible to reduce the dimensions of two heat storage and recovery stages. For this embodiment, these two additional heat exchangers can be traversed in series by the gas at the expansion line outlet. Preferably, the two additional heat exchanger means can be arranged in the first two expansion stages. Thus, the heat of the gas at the expansion line outlet is used to heat the cooler gas at the compression storage outlet and at the first expansion stage outlet, which allows reduction of the dimensions of the heat storage and recovery of the first two expansion stages, which are the heat storage and recovery with the highest pressure constraints, and therefore the most expensive heat storage and recovery. For this embodiment of the invention, the gas at the expansion line outlet can first flow through the additional heat exchanger of the second expansion stage, then through the additional heat exchanger of the first expansion stage.

Advantageously, the additional heat exchanger means can be located between the liquid delivery and the heat storage and recovery. Thus, the additional heat exchanger can heat the mixture of gas and liquid, promoting vaporization of the liquid.

As a variant, the additional heat exchanger can be located before the liquid delivery, or it can be arranged between the heat storage and recovery and the expansion stage.

Furthermore, the invention relates to a compressed-gas energy storage and recovery method.

The method according to the invention comprises the following steps:

in energy storage phase (compression phase):

a) successively compressing at least twice a gas in a compression line comprising at least two compression stages, each compression stage comprising at least one compressor;

b) after each compression stage, recovering the heat of the compressed gas in at least one heat storage and recovery;

c) storing the cooled compressed gas at the compression line outlet in a compressed gas storage;

in energy recovery phase (expansion phase):

d) circulating the compressed gas leaving the compressed gas storage in an expansion line comprising at least two successive expansion stages, and in each expansion stage, heating the compressed gas by circulation in one of the heat storage and recovery storage using the heat stored during the compression step, then expanding the heated compressed gas in an expansion device.

In addition, according to the invention, the heat is stored and recovered in heat storage particles. In other words, the heat storage and recovery comprise heat storage particles. Thus, heat exchanger occurs through direct exchange between the gas and a material, the material remaining in the heat storage and recovery. In other words, there is no heat storage particle circulation. It is therefore not necessary to have a dedicated system comprising tanks for storing a heat transfer fluid, pumps and dedicated pipes. For example, the material can be stones, concrete, gravel, phase change material (PCM) balls, zeolites or any similar material.

Furthermore, prior to each expansion step, a liquid is fed into and mixed with the compressed gas before the gas heating step. Each expansion stage therefore comprises a liquid delivery and mixer thus making it possible to use the liquid recovered from condensation in the compression line. Thus, through the injection of liquid, the gas flow rate is increased in each expansion stage, which allows the efficiency of the system and of the method to be increased. The liquid delivery and mixing are provided in the expansion line upstream from the heat storage, thus the injected liquid and water mixture is heated in the heat storage means, which allows vaporization of the liquid, and thus only gas is fed into the expansion stage.

Preferably, the compressed-gas energy storage and recovery method can use the compressed-gas energy storage and recovery system according to any one of the variants or variant combinations described above.

According to an embodiment of the invention, the gas can be air. It may be air taken from the ambient environment.

According to an aspect of the invention, the liquid can be water. It may notably be the humidity present in the gas, in particular when the gas is air.

According to an embodiment of the invention, after each compression step, the gas and the liquid present in the gas can be separated.

Moreover, the method can comprise a liquid storage step for storing the liquid extracted from the compression line. For example, one liquid storage per compression step (therefore per gas/liquid separation step) can be provided. Thus, the liquid can be stored at different pressures. Advantageously, the liquid fed into the gas is the liquid from the storage step, thus making it possible to use a liquid recovered from condensation in the compression line.

According to an embodiment of the invention, the gas/liquid separation step can be carried out after the heat storage step. It is thus possible to extract the liquid formed by condensation in the heat storage and recovery.

Advantageously, it is possible to carry out as many compression steps as there are expansion steps. In this case, the compression line and the expansion line can comprise the same number of stages. In other words, the number of compression steps and the number of expansion steps can be identical. This embodiment enables a "symmetrical" design of the compression and expansion lines, with notably similar operating pressures and temperatures, which promotes heat exchanges in the heat storage and recovery, and allows reinjection of the liquid into an expansion stage that corresponds to the corresponding compression stage. Thus, the system and the method are simplified.

For this embodiment, the number of compression and expansion stages can range between two and six, preferably between three and five. For example, the number of compression and expansion stages can be three, which enables good temperature and pressure management while keeping a simple design.

As a variant, the number of compression stages and the number of expansion stages can be different. For this embodiment, at least part of the heat storage and recovery means, and at least part of the liquid delivery means, can be pooled.

In addition, the energy storage phase can comprise a cooling step. This cooling step can be carried out after the heat storage step using cooling. This cooling step enables more significant cooling of the gas, which allows the dimensions of the heat storage and recovery means to be reduced. The coolers can be air coolers or heat exchangers (shell/tube, plate, spiral or other suitable technologies) exchanging with a heat transfer fluid that can be water, propane, butane or any other suitable coolant for the required cooling. The coolers can be suited to the pressure of the incoming air exchanging with each one of them.

For this embodiment, the gas/liquid separation step can be carried out after the cooling step. It is thus possible to extract the liquid formed by condensation in the heat storage and recovery, and in the cooling step.

According to an embodiment, the energy recovery phase can comprise at least one additional heat exchange step, between the gas at the expansion line outlet and the compressed gas. Thus, the hot gas at the expansion line outlet is cooled, while the compressed gas in the expansion line can be heated. It is thus possible to recover lost thermal energy, and thereby to decrease the compressed gas heating needs, which allows reducing the dimensions of at least one heat storage and recovery (and therefore the cost of the heat storage and recovery).

According to an implementation of this embodiment, the additional heat exchange can be provided for the first expansion step (in the first expansion stage). The "first expansion step" is understood to be the first expansion step traversed by the gas in the expansion line. In other words, the first expansion step follows the compressed gas storage step. Thus, the heat of the gas at the expansion line outlet is used to heat the cooler gas at the compression storage outlet, which allows reduction of the dimensions of the heat storage and recovery of the first expansion stage, which is the heat storage and recovery with the highest pressure constraints, and therefore the most expensive heat storage and recovery.

As a variant, the additional heat exchange can be carried out in an expansion step performed between the first and the last expansion step.

According to an aspect of this embodiment, the energy recovery phase can comprise two additional heat exchanges, which are carried out in two different expansion steps. It is thus possible to reduce the dimensions of two heat storage and recovery. For this embodiment, the two additional heat exchanges can be traversed in series by the gas at the expansion line outlet. Preferably, the two additional heat exchanges can be provided in the first two expansion steps. Thus, the heat of the gas at the expansion line outlet is used to heat the cooler gas at the compression storage outlet and at the first expansion stage outlet, which allows reduction of the dimensions of the heat storage and recovery of the first two expansion stages, which are the heat storage and recovery with the highest pressure constraints, and therefore the most expensive heat storage and recovery. For this embodiment of the invention, the gas at the expansion line outlet can first flow through the additional heat exchange of the second expansion stage, then through the additional heat exchange means of the first expansion stage.

Advantageously, the additional heat exchange can be carried out between the liquid delivery step and the heat recovery step of the heat storage and recovery. Thus, the additional heat exchange can heat the mixture of gas and liquid, promoting vaporization of the liquid.

As a variant, the additional heat exchange can be carried out before the liquid delivery step.

Figure 2:
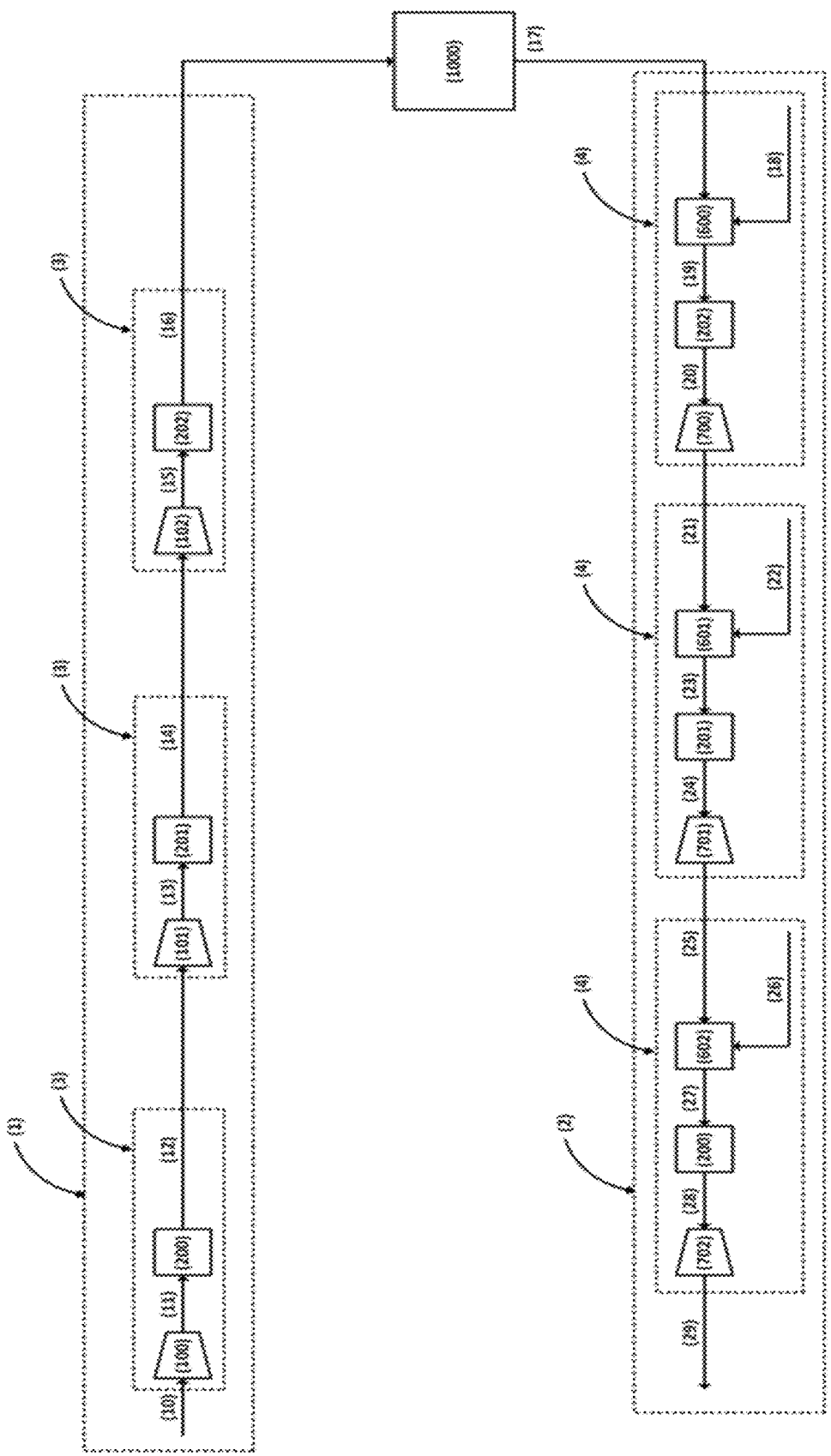
FIG. 2 illustrates a compressed-gas energy storage and recovery system and method according to a first embodiment of the invention.

FIG. 2 schematically illustrates, by way of non-limitative example, a compressed-gas (air here) energy storage and recovery system and method according to a first embodiment of the invention. According to this first embodiment, the method and the system are comprised of a compression line (1) including three compression stages (3) depending on the air pressure to be reached. Each compression stage (3) comprises a compression means (100, 101, 102), also referred to as compressor. These compressors (100, 101, 102) can be axial or centrifugal, or of any other technology. Compressor (100) is a low-pressure compressor, compressor (101) is a medium-pressure compressor, and compressor (102) is a high-pressure compressor. The gas used (10) in the system and the method is ambient air having a water saturation related to the temperature and pressure thereof. What is referred to as low-pressure element (for example turbine, compressor, etc.) is an element suited for the low pressure at which the gas or the liquid flows in the element, a medium-pressure element is an element suited for the medium pressure at which the gas or the liquid flows in the element, and a high-pressure element is an element suited for the high pressure at which the gas or the liquid flows in the element.

During the energy storage phase (1), the air is compressed in compression line (1), then sent to a compressed air storage means (1000) suited for high pressures. This compressed air storage (1000) can be a natural cave such as a salt cavern, a former mine, an aquifer or an artificial storage site.

Heat storage and recovery devices (200, 201, 202) are arranged after each compressor (100, 101, 102) in order to cool the hot compressed air at the compression outlet while storing the recovered thermal energy. Exchange/storage occurs through direct contact between the air and the material allowing the heat from the air to be stored. This material can be stones, concrete, gravel, or any other suitable solid material. Heat storage and recovery devices (200, 201, 202) are suited for the pressure of the incoming air yielding its energy to each one of them. Heat storage and recovery means (200) is suited for low pressure, heat storage and recovery means (201) is suited for medium pressure, and heat storage and recovery means (202) is suited for high pressure.

During the energy production phase, the compressed air flows through expansion line (2), which comprises three expansion stages (4). The air is expanded via one or more expansion means, turbines (700, 701, 702) for example, arranged in each expansion stage (4), in order to produce electricity via generators (not shown). Turbine (702) is a low-pressure turbine, turbine (701) is a medium-pressure turbine, and turbine (700) is a high-pressure turbine.

As a first step in each expansion stage (4), condensed water is injected into the compressed air via mixers (600, 601, 602). The compressed air/water mixture is heated, prior to entering the turbine, by heat storage and recovery (200, 201, 202), thermally loaded during the previous compression phase (1). The condensed water injected in each expansion stage (4) is evaporated and the air is heated. There is therefore no liquid water at the inlet of turbines (700, 701, 702), which is preferable for proper operation thereof. In addition, the higher rate of flow due to the reinjection of water, and the high temperature at the inlet of turbines (700, 701, 702), provides better process efficiency.

Figure 3:
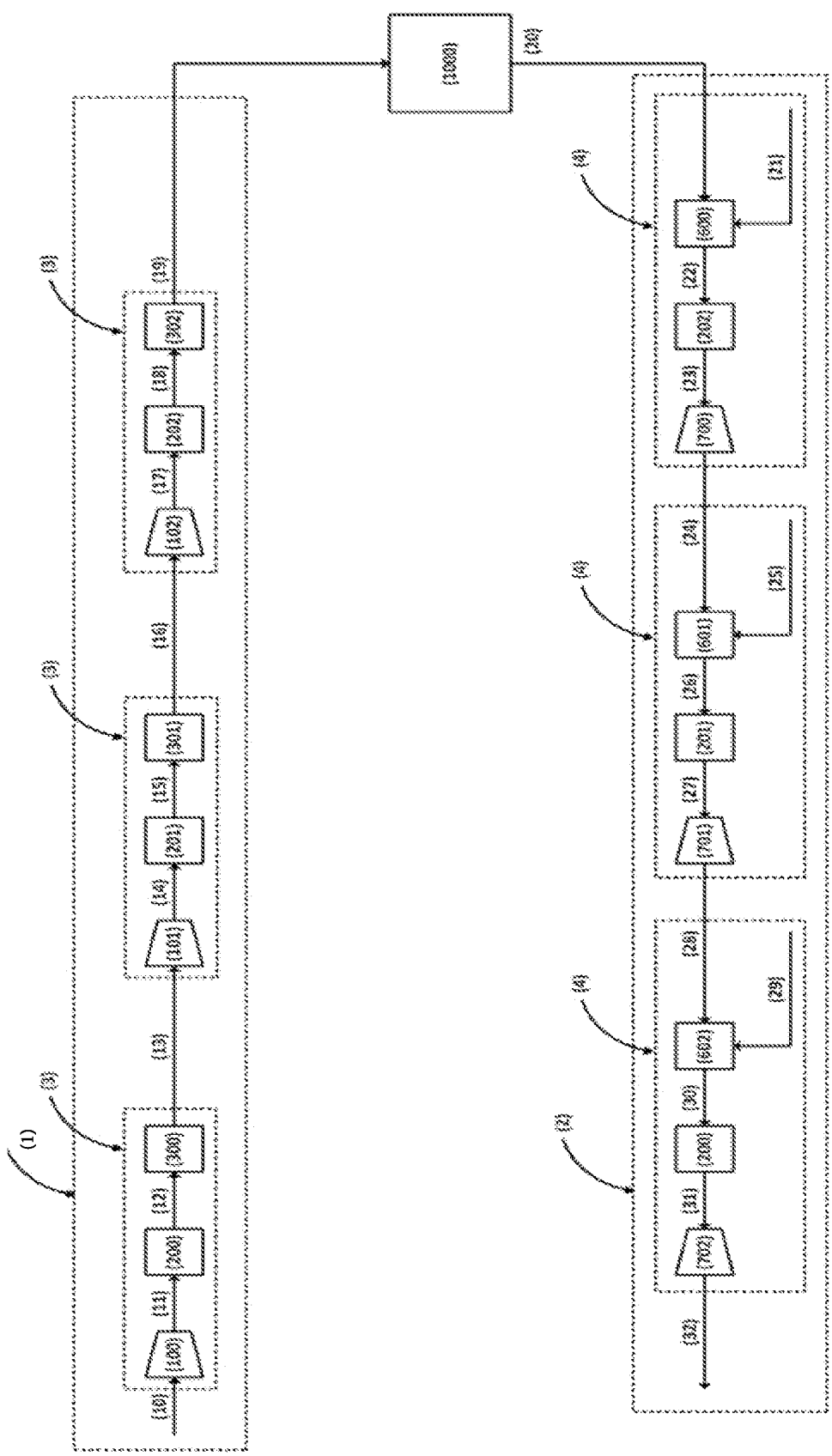
FIG. 3 illustrates a compressed-gas energy storage and recovery system and method according to a second embodiment of the invention.

FIG. 3 schematically illustrates, by way of non-limitative example, a compressed-gas (air here) energy storage and recovery system and method according to a second embodiment of the invention. The second embodiment corresponds to the first embodiment where cooling (300, 301, 302) have been added in compression line (1). Therefore, only compression line (1) is described for this embodiment.

Each compression stage (3) comprises a compression means (100, 101, 102) also referred to as compressor. These compressors (100, 101, 102) can be axial or centrifugal, or of any other technology. Compressor (100) is a low-pressure compressor, compressor (101) is a medium-pressure compressor, and compressor (102) is a high-pressure compressor. The gas used (10) in the system and the method is ambient air having a water saturation related to the temperature and pressure thereof.

During energy storage phase (1), the air is compressed in the compression line, then sent to a compressed air storage means (1000) suited for high pressures. This compressed air storage (1000) can be a natural cave such as a salt cavern, a former mine, an aquifer or an artificial storage site.

Heat storage and recovery (200, 201, 202) are arranged after each compressor (100, 101, 102) in order to cool the hot compressed air at the compression outlet while storing this thermal energy. Exchange/storage occurs through direct contact between the air and the material allowing the heat from the air to be stored. This material can be stones, concrete, gravel, or any other suitable solid material. Heat storage and recovery (200, 201, 202) are suited for the pressure of the incoming air yielding its energy to each one of them. Heat storage and recovery (200) is suited for low pressure, heat storage and recovery (201) is suited for medium pressure, and heat storage and recovery (202) is suited for high pressure. Cooling means (300, 301, 302) can be arranged after heat storage and recovery (200, 201, 202) if necessary in order to complete cooling of the compressed air before the next compression stage or prior to storage. These cooling systems (300, 301, 302) can be air coolers or heat exchangers (shell/tube, plate, spiral or other suitable technologies) exchanging with a heat transfer fluid that can be water, propane, butane or any other suitable coolant for the required cooling. Coolers (300, 301, 302) are suited for the pressure of the incoming air exchanging with each one of them. Cooling (300) is suited for low pressure, cooling (301) is suited for medium pressure, and cooling (302) is suited for high pressure.

Figure 4:
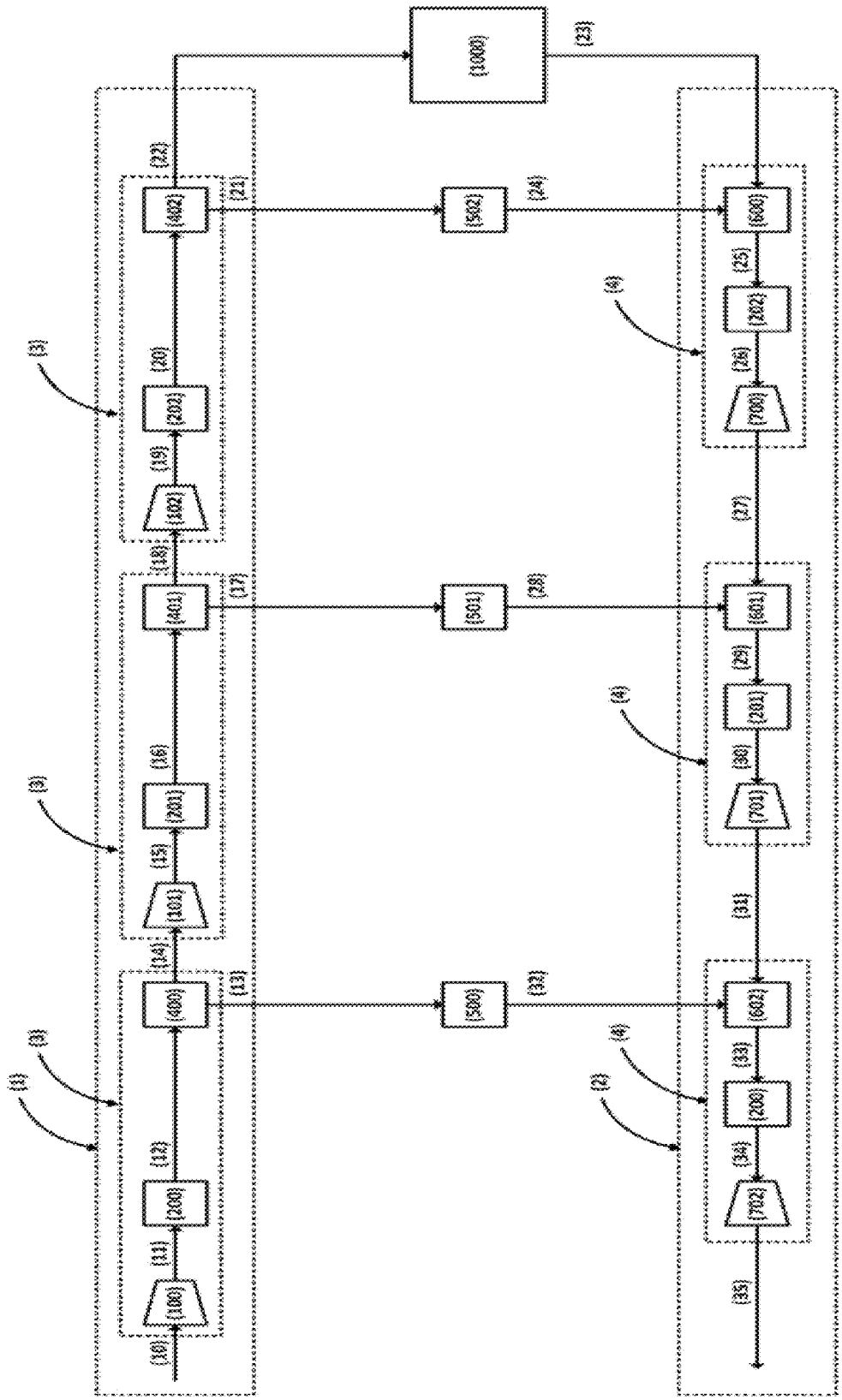
FIG. 4 illustrates a compressed-gas energy storage and recovery system and method according to a third embodiment of the invention.

FIG. 4 schematically illustrates, by way of non-limitative example, a compressed-gas (air here) energy storage and recovery system and method according to a third embodiment of the invention. According to the third embodiment, the method and the system are comprised of a compression line including three compression stages (3) depending on the air pressure to be reached. Each compression stage (3) comprises a compression means (100, 101, 102), also referred to as compressor. These compressors (100, 101, 102) can be axial or centrifugal, or of any other technology. Compressor (100) is a low-pressure compressor, compressor (101) is a medium-pressure compressor, and compressor (102) is a high-pressure compressor. The gas used (10) in the system and the method is ambient air having a water saturation related to the temperature and pressure thereof.

During the energy storage phase, the air is compressed in compression line (1), then sent to a compressed air storage (1000) suited for high pressures. This compressed air storage (1000) can be a natural cave such as a salt cavern, a former mine, an aquifer or an artificial storage site.

Heat storage and recovery devices (200, 201, 202) are arranged after each compressor (100, 101, 102) in order to cool the hot compressed air at the compression outlet while storing this thermal energy. Exchange/storage occurs through direct contact between the air and the material allowing the heat from the air to be stored. This material can be stones, concrete, gravel, or any other suitable solid material. Heat storage and recovery (200, 201, 202) are suited for the pressure of the incoming air yielding its energy to each one of them. Heat storage and recovery (200) is suited for low pressure, heat storage and recovery (201) is suited for medium pressure, and heat storage and recovery (202) is suited for high pressure.

Once the air is cooled and before the next compression stage, the condensed water (i.e. the liquid present in the air) from the humidity in the air is extracted from the compression line by gas/liquid separators (400, 401, 402) to have air without any trace of liquid water at the inlet of the compressor or of compressed gas storage (1000). This water condensation can take place in heat storage and recovery (200, 201, 202). The condensed water at each compression stage is sent into liquid storage (500, 501, 502), which each withstand the pressure at which the water is extracted from air, in other words, liquid storage (500) is suited for low pressure, liquid storage (501) is suited for medium pressure, and liquid storage (502) is suited for high pressure.

During the energy production phase, the compressed air flows through expansion line (2), which comprises three expansion stages (4). The air is expanded via one or more expansion devices, for example turbines (700, 701, 702) arranged in each expansion stage (4), in order to produce electricity via generators, not shown. Turbine (702) is a low-pressure turbine, turbine (701) is a medium-pressure turbine, and turbine (700) is a high-pressure turbine.

As a first step in each expansion stage (4), the condensed water from liquid storage (500, 501, 502) is reinjected into the compressed air of same pressure level via mixers (600, 601, 602). The compressed air/condensed water mixture is heated, prior to entering the turbine, by heat storage and recovery (200, 201, 202), thermally loaded during the previous compression phase (1). The condensed water reinjected in each expansion stage is evaporated and the air is heated. There is therefore no liquid water at the inlet of turbines (700, 701, 702), which is preferable for proper operation, and the higher rate of flow due to the reinjection of water and the high temperature at the inlet of turbines (700, 701, 702) provide better process efficiency.

Figure 5:
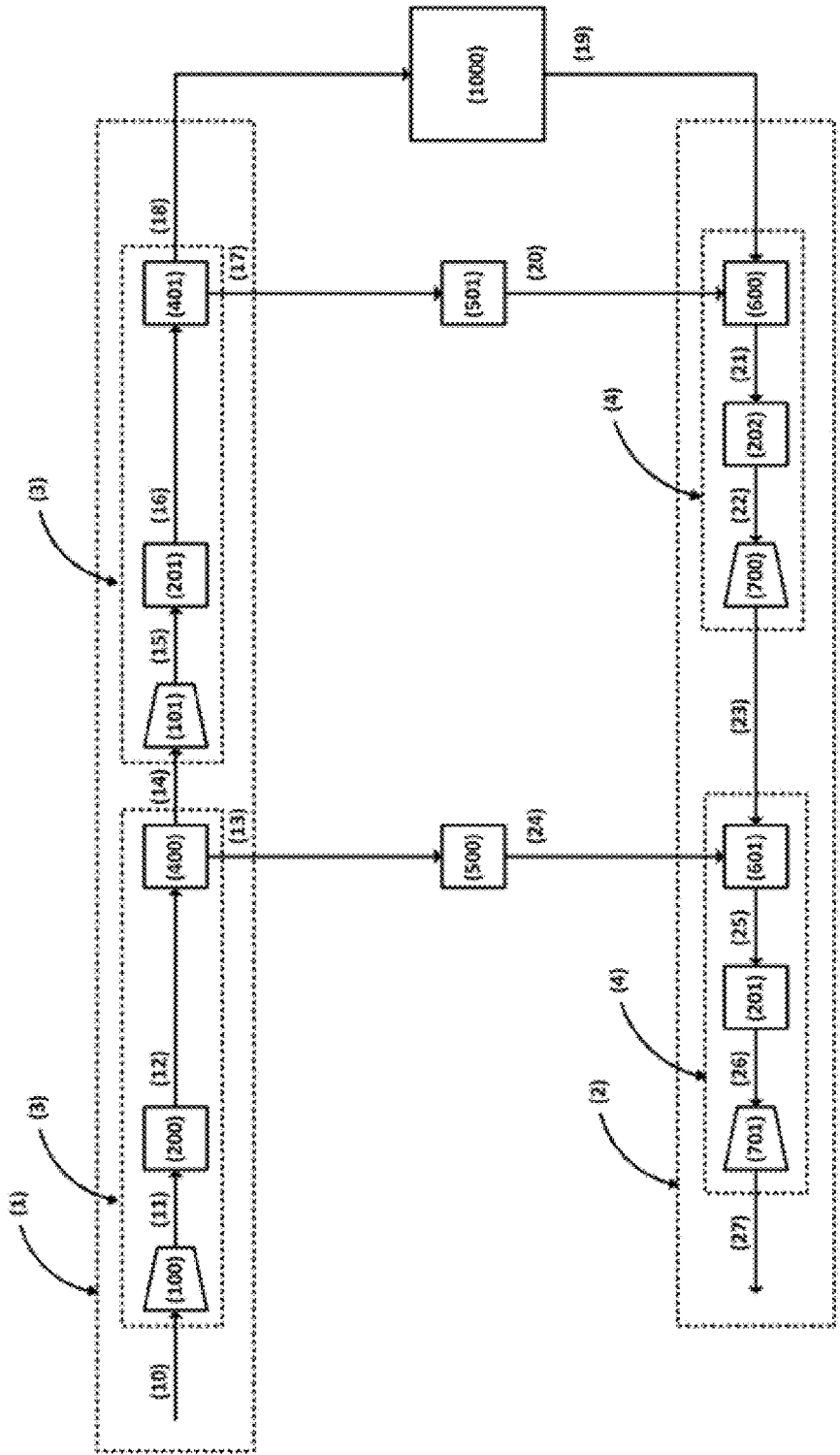
FIG. 5 illustrates a compressed-gas energy storage and recovery system and method according to a fourth embodiment of the invention.

FIG. 5 schematically illustrates, by way of non-limitative example, a compressed-gas (air here) energy storage and recovery system and method according to a fourth embodiment of the invention. The fourth embodiment differs from the third embodiment in the number of compression stages and the number of expansion stages. For this embodiment, compression line (1) comprises two compression stages (3) and expansion line (2) comprises two expansion stages (4).

The third embodiment can also be modified by adding compression stages and/or expansion stages.

Figure 6:
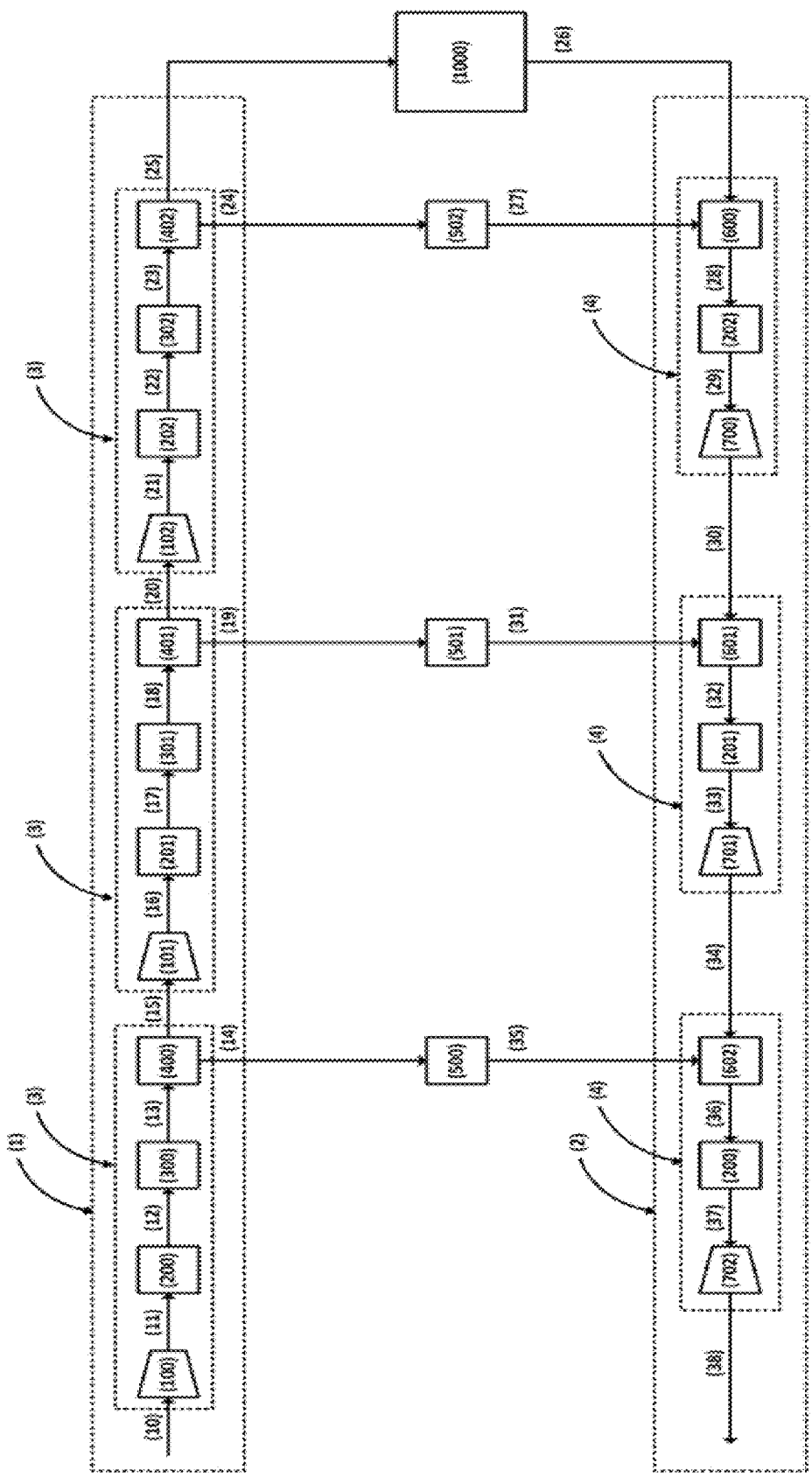
FIG. 6 illustrates a compressed-gas energy storage and recovery system and method according to a fifth embodiment of the invention.

FIG. 6 schematically illustrates, by way of non-limitative example, a compressed-gas (air here) energy storage and recovery system and method according to a fifth embodiment of the invention. The fifth embodiment corresponds to the third embodiment where coolers (300, 301, 302) have been added in compression line (1). Therefore, only compression line (1) is described for this embodiment.

According to the fifth embodiment, the method and the system are comprised of a compression line (1) including three compression stages (3) depending on the air pressure to be reached. Each compression stage (3) comprises a compression means (100, 101, 102), also referred to as compressor. These compressors (100, 101, 102) can be axial, centrifugal, or of any other technology. Compressor (100) is a low-pressure compressor, compressor (101) is a medium-pressure compressor, and compressor (102) is a high-pressure compressor. The compressed gas (10) in the system and the method is ambient air having a water saturation related to the temperature and pressure thereof.

During the energy storage phase, the air is compressed in compression line (1), then sent to a compressed air storage (1000) suited for high pressures. This compressed air storage (1000) can be a natural cave such as a salt cavern, a former mine, an aquifer or an artificial storage site.

Heat storage and recovery (200, 201, 202) are arranged after each compressor or compression stage (100, 101, 102) in order to cool the hot compressed air at the compression outlet while storing this thermal energy. Exchange/storage occurs through direct contact between the air and the material allowing the heat from the air to be stored. This material can be stones, concrete, gravel, or any other suitable solid material. Heat storage and recovery (200, 201, 202) are suited for the pressure of the incoming air yielding its energy to each one of them. Heat storage and recovery (200) is suited for low pressure, heat storage and recovery (201) is suited for medium pressure, and heat storage and recovery (202) is suited for high pressure. Coolers (300, 301, 302) can be arranged after heat storage and recovery (200, 201, 202) if necessary, in order to complete cooling of the compressed air before the next compression stage or prior to storage. These coolers (300, 301, 302) can be air coolers or heat exchangers (shell/tube, plate, spiral or other suitable technologies) exchanging with a heat transfer fluid that can be water, propane, butane or any other suitable coolant for the required cooling. Coolers (300, 301, 302) are suited for the pressure of the incoming air exchanging with each one of them. Cooler (300) is suited for low pressure, cooler (301) is suited for medium pressure, and cooler (302) is suited for high pressure.

Once the air is cooled and before the next compression stage, the condensed water (i.e. the liquid present in the air) from the humidity in the air is extracted from the compression line by gas/liquid separators (400, 401, 402) so as to have air without any trace of liquid water at the inlet of the compressor or of compressed gas storage (1000). This water condensation can take place in heat storage and recovery (200, 201, 202) and/or in cooler (300, 301, 302). The condensed water at each compression stage is sent into liquid storage (500, 501, 502), which each withstand the pressure at which the water is extracted from air, in other words, liquid storage (500) is suited for low pressure, liquid storage (501) is suited for medium pressure, and liquid storage (502) is suited for high pressure.

The fifth embodiment can also be modified by adapting the number of compression stages and/or of expansion stages.

Figure 7:
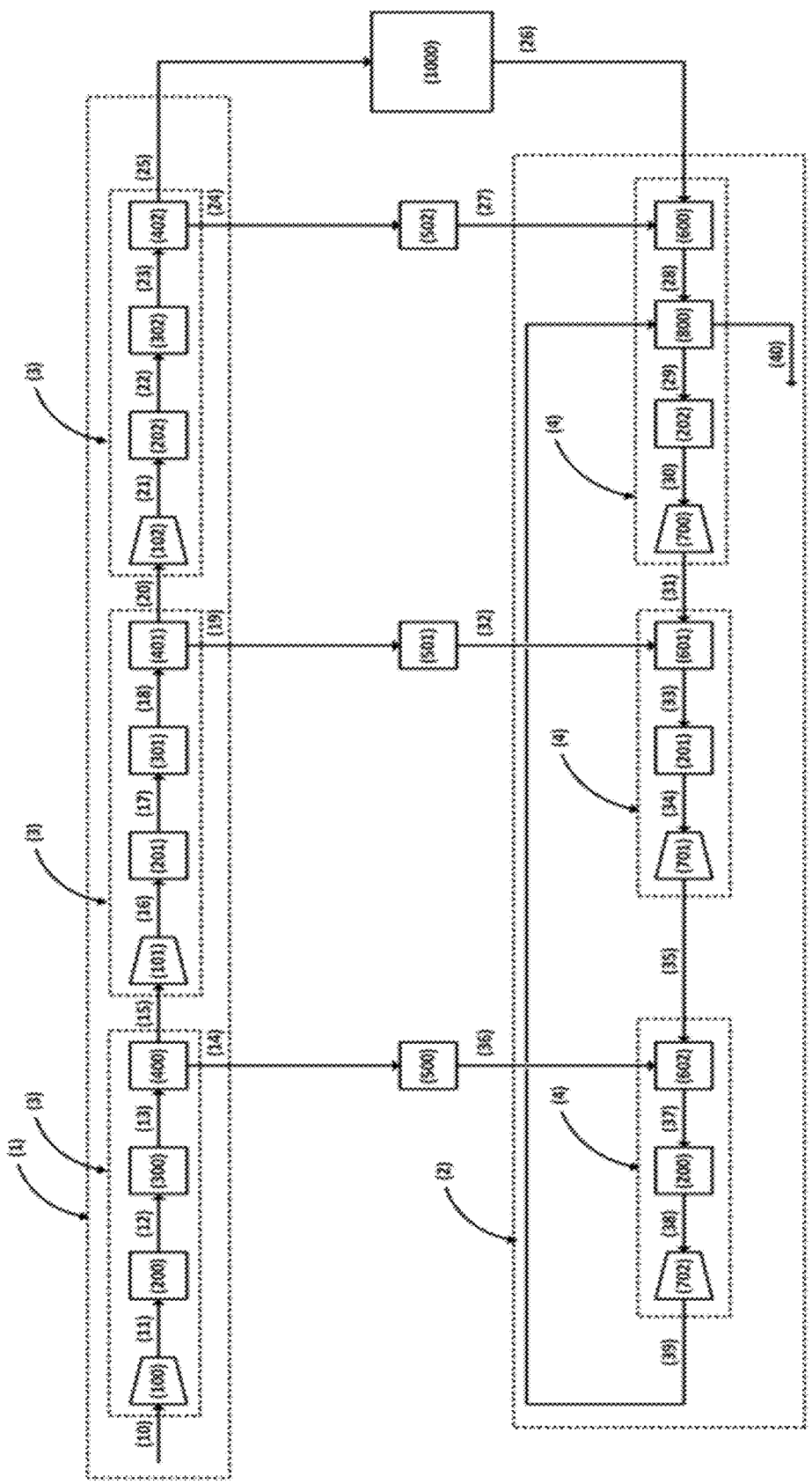
FIG. 7 illustrates a compressed-gas energy storage and recovery system and method according to a sixth embodiment of the invention.

FIG. 7 schematically illustrates, by way of non-limitative example, a compressed-gas (air here) energy storage and recovery system and method according to a sixth embodiment of the invention. The sixth embodiment corresponds to the fifth embodiment where an additional heat exchanger (800) is provided in expansion line (2), between the outgoing air and the compressed gas. Therefore, only expansion line (2) is described for this embodiment.

During the energy production phase, the compressed air flows through expansion line (2), which comprises three expansion stages (4). The air is expanded via one or more expansion devices, for example turbines (700, 701, 702) arranged in each expansion stage (4) in order to produce electricity via generators (not shown). Turbine (702) is a low-pressure turbine, turbine (701) is a medium-pressure turbine and turbine (700) is a high-pressure turbine.

As a first step in each expansion stage (4), the condensed water from liquid storage (500, 501, 502) is reinjected into the compressed air of same pressure level via mixers (600, 601, 602). The compressed air/condensed water mixture is heated, prior to entering the turbine, by heat storage and recovery (200, 201, 202), thermally loaded during the previous compression phase (1). The condensed water reinjected in each expansion stage (4) is evaporated and the air is heated. There is therefore no liquid water at the inlet of turbines (700, 701, 702), which is preferable for proper operation thereof. Furthermore, the higher rate of flow due to the reinjection of water and the high temperature of expansion line (2) at the inlet of turbines (700, 701, 702) provides better process efficiency.

The heat of the air from the air leaving low-pressure turbine (700) is used to heat the air from compressed gas storage (1000) and mixed with condensation water (28) via an additional heat exchange (800). For this embodiment, additional heat exchange (800) is located in first expansion stage (4) of expansion line (2). In addition, additional heat exchange (800) is arranged between mixer (600) and heat storage and recovery (202). This additional heat exchange (800) can be of shell/tube, plate or spiral type, or of any other suitable technology.

The sixth embodiment can also be modified by adapting the number of compression stages and/or of expansion stages.

Additionally, compression line (1) can also be similar to the embodiment of FIG. 4, i.e. without cooling (300, 301, 302).

Figure 8:
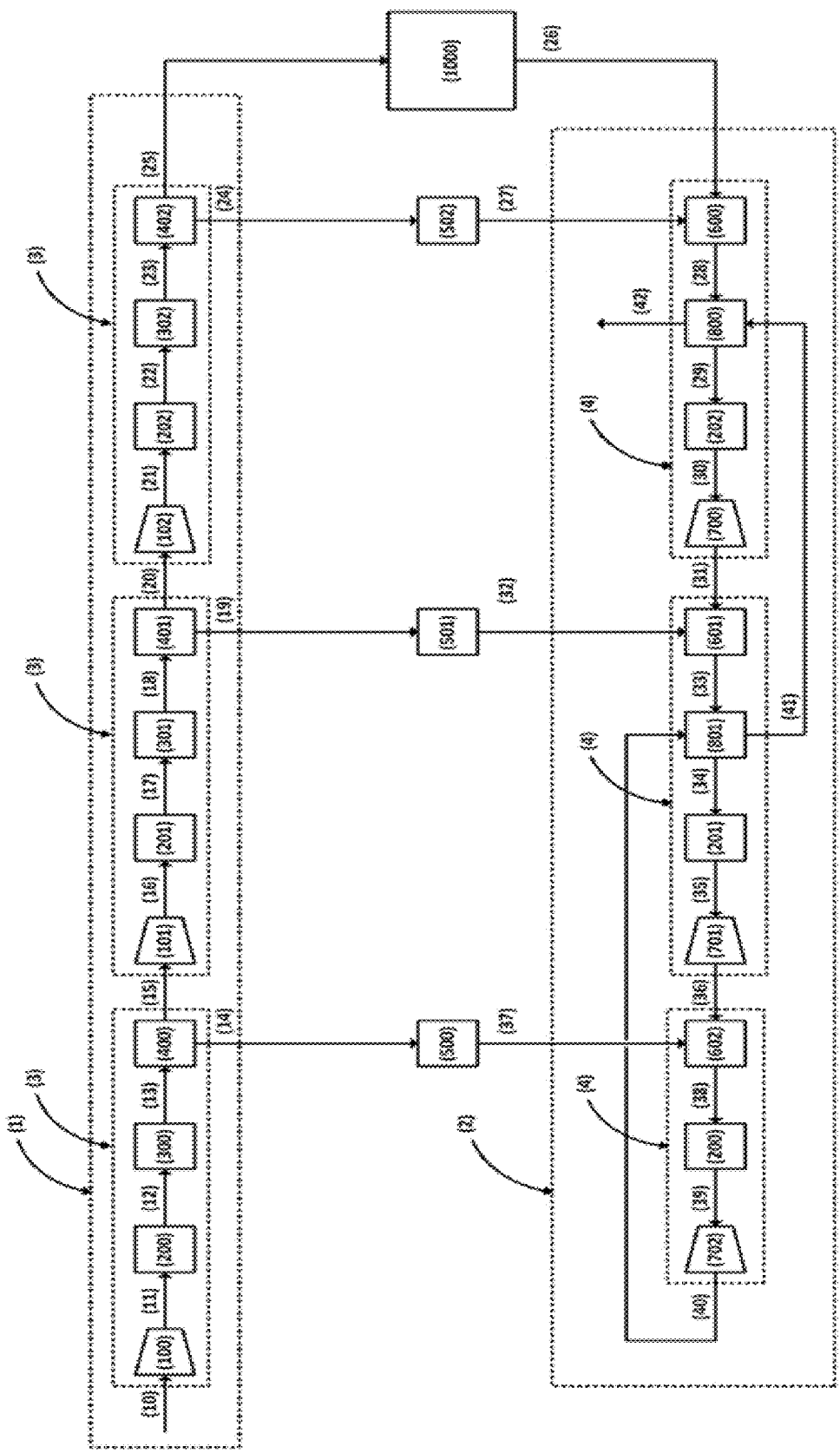
FIG. 8 illustrates a compressed-gas energy storage and recovery system and method according to a seventh embodiment of the invention.

FIG. 8 schematically illustrates, by way of non-limitative example, a compressed-gas (air here) energy storage and recovery system and method according to a seventh embodiment of the invention. The seventh embodiment corresponds to the fifth embodiment where two additional heat exchangers (800, 801) are provided in expansion line (2), between the outgoing air and the compressed gas. Therefore, only expansion line (2) is described for this embodiment.

During the energy production phase, the compressed air flows through expansion line (2), which comprises three expansion stages (4). The air is expanded via one or more expansion devices, for example turbines (700, 701, 702) arranged in each expansion stage (4) in order to produce electricity via generators, not shown. Turbine (702) is a low-pressure turbine, turbine (701) is a medium-pressure turbine, and turbine (700) is a high-pressure turbine.

As a first step in each expansion stage (4), the condensed water from liquid storage (500, 501, 502) is reinjected into the compressed air of same pressure level via mixers (600, 601, 602). The compressed air/condensed water mixture is heated, prior to entering the turbine, by heat storage and recovery (200, 201, 202), thermally loaded during the previous compression phase (1). The condensed water reinjected in each expansion stage is evaporated and the air is heated. There is therefore no liquid water at the inlet of turbines (700, 701, 702), which is preferable for proper operation thereof. Furthermore, the rate of flow is higher due to the reinjection of water, and the high temperature of expansion line (2) at the inlet of turbines (700, 701, 702) provides better process efficiency.

The heat of the air from the air leaving low-pressure turbine (700) is used to heat the air from compressed gas storage (1000) and is mixed with condensation water (28) via an additional heat exchange (800), as well as the air from the second expansion stage, mixed with condensation water (33) via an additional heat exchange (801). For this embodiment, additional heat exchange (800, 801) are arranged in first expansion stage (4) and in second expansion stage (4) of expansion line (2). Furthermore, in each expansion stage, additional heat exchange (800, 801) are arranged between mixer (600, 601) and heat storage and recovery (202, 201). These additional heat exchangers (800, 801) can be of shell/tube, plate or spiral type, or of any other suitable technology. For the embodiment illustrated, the air (40) from low-pressure turbine (702) comprising waste heat heats in series stream (33) upstream from medium-pressure thermal energy storage means (201), then stream (28) upstream from high-pressure thermal energy storage (202).

The seventh embodiment can also be modified by adapting the number of compression stages and/or expansion stages.

In addition, the compression line can also be similar to the embodiment of FIG. 4, that is without cooling means (300, 301, 302).

The invention is not limited to the embodiments of the system and of the method described above by way of example, and that it encompasses all variant embodiments.

COMPARATIVE EXAMPLES

The features and advantages of the method according to the invention will be clear from reading the application examples hereafter.

Example No. 1—not According to the Invention

This example implements the system and the method illustrated in FIG. 1, which is not according to the invention.

During compression phase (1), a stream of outside air (10), at a pressure of 1.02 bar (0.102 MPa) and at a temperature of 27° C., with a humidity of 14.6 g water/kg air (gram of water per kilogram of air), is compressed by a low-pressure compressor (100) from which it flows (11) at a temperature of 255° C. and a pressure of 6 bar (0.6 MPa). This stream (11) is sent to a low-pressure heat storage and recovery means (200) that cools the air down to a temperature of 90° C. (12) and stores this thermal energy until expansion phase (2). Stream (12) is cooled again by a cooler (300) until it reaches a temperature of 50° C. at the outlet (13). Stream (13) then is air and water from the humidity in the air, condensed during the cooling phases in (200) and/or (300). This condensed water (14) is separated from compression line (1) in a gas/liquid separator (400) operating at the pressure of stream (13). Stream (15), totally gaseous again, is compressed by a medium-pressure compressor (101) from which it flows (16) at a temperature of 275° C. and a pressure of 28 bar (2.8 MPa). Stream (16) is sent to a medium-pressure heat storage and recovery (201) that cools the air down to a temperature of 100° C. (17) and stores this thermal energy until expansion phase (2). Stream (17) is cooled again by a cooling (301) until a temperature of 50° C. is reached at the outlet (18). Stream (18) then is air and water from the humidity in the air, condensed during the cooling phases in (201) and/or (301). This condensed water (19) is separated from compression line (1) in a gas/liquid separator (401) operating at the pressure of stream (18). Stream (20), again totally gaseous, is compressed by a high-pressure compressor (102) from which it flows (21) at a temperature of 250° C. and a pressure of 117 bar (11.7 MPa). Stream (21) is sent to a high-pressure heat storage and recovery (202) that cools the air down to a temperature of 45° C. (22) and stores this thermal energy until expansion phase (2). Stream (22) is cooled again by a cooling (302) until it reaches a temperature of 30° C. at the outlet (23), 30° C. being the air storage temperature. Stream (23) then is air and water, from the humidity in the air, condensed during the cooling phases in (202) and/or (302). This condensed water (24) is separated from compression line (1) in a gas/liquid separator (402) operating at the pressure of stream (23).

The air stream compressed to a pressure of 117 bar (11.7 MPa) and a temperature of 30° C. (25) is then sent to compressed air storage (1000) until energy recovery phase (2).

When electricity is to be produced, compressed air stream (26) at a pressure of 117 bar (11.7 MPa) and at a temperature of 30° C., leaving compressed air storage (1000), is heated in high-pressure heat storage and recovery (202) that releases the heat stored during compression phase (1) until stream (27) reaches a temperature of 240° C. This hot compressed air stream (27) is expanded in high-pressure turbine (702) producing electricity via a generator, until a pressure of 28 bar (2.8 MPa) and a temperature of 85° C. are reached at the outlet (28). Stream (28) is heated in medium-pressure heat storage and recovery (201) that releases the heat stored during compression phase (1) until stream (29) reaches a temperature of 265° C. This hot compressed air stream (29) is expanded in medium-pressure turbine (701) producing electricity via a generator, until a pressure of 5 bar (0.5 MPa) and a temperature of 75° C. are reached at the outlet (30). Stream (30) is heated in low-pressure heat storage and recovery (200) that releases the heat stored during compression phase (1) until stream (31) reaches a temperature of 245° C. This hot compressed stream (31) is expanded in low-pressure turbine (700) producing electricity via a generator, until a pressure of 1.02 bar (0.102 MPa) and a temperature of 80° C. are reached at the outlet (32).

The efficiency of the energy storage process of example 1 is 69.6% for a 100 MW power consumption of the compressors. The total flow rate of condensed water in the three compression stages is 7.5 t/h. The thermal storage capacity is 87 MWth (MW thermal) and the required cooling capacity is 20.5 MWth.

Example No. 2 According to the Invention

This example implements the system and the method according to the embodiment of the invention illustrated in FIG. 3.

During compression phase (1), a stream of dry air (10), at a pressure of 1.02 bar (0.102 MPa) and at a temperature of 27° C., with no trace of water, is compressed by a low-pressure compressor (100) from which it flows at a temperature of 260° C. and at a pressure of 6 bar (0.6 MPa). This stream (11) is sent to a low-pressure heat storage and recovery means (200) that cools the air down to a temperature of 60° C. (12) and stores this thermal energy until expansion phase (2). Stream (12) is cooled again by a cooling (300) until a temperature of 50° C. is reached at the outlet (13). Stream (13) is compressed by a medium-pressure compressor (101) which it leaves (14) at a temperature of 275° C. and a pressure of 28 bar (2.8 MPa). Stream (14) is sent to a medium-pressure heat storage and recovery (201) that cools the air to a temperature of 80° C. (15) and stores this thermal energy until expansion phase (2). Stream (15) is cooled again by a cooling means (301) until a temperature of 50° C. is reached at the outlet (16). This stream (16) is compressed by a high-pressure compressor (102) which it leaves (17) at a temperature of 250° C. and at a pressure of 117 bar (11.7 MPa). Stream (17) is sent to a high-pressure heat storage and recovery (202) that cools the air to a temperature of 40° C. (18) and stores this thermal energy until expansion phase (2). Stream (18) is cooled again by a cooling (302) until it reaches a temperature of 30° C. at the outlet (19), 30° C. being the air storage temperature.

The air stream compressed to a pressure of 117 bar (11.7 MPa) and at a temperature of 30° C. (19) is then sent to a compressed air storage (1000) until energy recovery phase (2).

When electricity is to be produced, an optimized stream of liquid water (21) at a pressure of 117 bar (11.7 MPa) and a temperature of 30° C. is injected into the compressed air stream (20) leaving storage (1000) via mixer (600) to form stream (22). Stream (22) is heated in high-pressure heat storage and recovery (202) that releases the heat stored during compression phase (1) until stream (23) reaches a temperature of 240° C. This hot compressed air stream (23) is expanded in high-pressure turbine (700) producing electricity via a generator, until it reaches a pressure of 28 bar (2.8 MPa) and a temperature of 85° C. at the outlet (24). An optimized stream of liquid water (25) at a pressure of 28 bar (2.8 MPa) and a temperature of 50° C. is injected into compressed air stream (24) via mixer (601) to form stream (26). Stream (26) is heated in medium-pressure heat storage and recovery (201) that releases the heat stored during compression phase (1) until stream (27) reaches a temperature of 265° C. This hot compressed air stream (27) is expanded in medium-pressure turbine (701) producing electricity via a generator, until a pressure of 5 bar (0.5 MPa) and a temperature of 75° C. are reached at the outlet (28). An optimized stream of liquid water (29) at a pressure of 6 bar (0.6 MPa) and a temperature of 50° C. is injected into compressed air stream (28) via mixer (600) to form stream (30). Stream (30) is heated in low-pressure heat storage and recovery (200) that releases the heat stored during compression phase (1) until stream (31) reaches a temperature of 245° C. This hot compressed air stream (31) is expanded in low-pressure turbine (702) producing electricity via a generator, until a pressure of 1.02 bar (0.102 MPa) and a temperature of 80° C. are reached at the outlet (32).

The efficiency of the energy storage method is 71.6% for a 100 MW power consumption of the compressors. The total flow rate of liquid water injected in the three compression stages is 9.1 t/h. The thermal storage capacity is 94.6 MWth and the required cooling capacity is 8.0 MWth.

Water injection thus allows, by increasing the rate of flow through the turbines in expansion, to improve the process efficiency by more than 2% in relation to example 1 not according to the invention, and to reduce the required cooling capacity.

Example No. 3 According to the Invention

This example implements the system and the method according to the embodiment of the invention illustrated in FIG. 6.

During compression phase (1), a stream of outside air (10), at a pressure of 1.02 bar (0.102 MPa) and a temperature of 27° C., with a humidity of 14.6 g water/kg air, is compressed by a low-pressure compressor (100) which it leaves (11) at a temperature of 255° C. and a pressure of 6 bar (0.6 MPa). This stream (11) is sent to a low-pressure heat storage and recovery (200) that cools the air down to a temperature of 80° C. (12) and stores this thermal energy until expansion phase (2). Stream (12) is cooled again by a cooling means (300) to a temperature of 50° C. at the outlet (13). Stream (13) then consists of air and water from the humidity in the air, condensed during the cooling phases in (200) and/or (300). This condensed water (14) is separated from the stream of compression line (1) in a gas/liquid separator (400) operating at the pressure of stream (13), then it is sent to a liquid storage (500) at a maintained pressure of 6 bar (0.6 MPa). Stream (15), totally gaseous again, is compressed by a medium-pressure compressor (101) which it leaves (16) at a temperature of 275° C. and a pressure of 28 bar (2.8 MPa). Stream (16) is sent to a medium-pressure heat storage and recovery (201) that cools the air down to a temperature of 80° C. (17) and stores this thermal energy until expansion phase (2). Stream (17) is cooled again by a cooling means (301) until it reaches a temperature of 50° C. at the outlet (18). Stream (18) then is air and water from the humidity in the air, condensed during the cooling phases in (201) and/or (301). This condensed water (19) is separated from the stream of compression line (1) in a liquid/gas separator (401) operating at the pressure of stream (18) and then is sent to a liquid storage (501) at a maintained pressure of 28 bar (2.8 MPa). Stream (20), totally gaseous again, is compressed by a high-pressure compressor (102) from which it flows (21) at a temperature of 250° C. and a pressure of 117 bar (11.7 MPa). Stream (21) is sent to a high-pressure heat storage and recovery (202) that cools the air down to a temperature of 40° C. (22) and stores this thermal energy until expansion phase (2). Stream (22) is again cooled by a cooler means (302) until a temperature of 30° C. is reached at the outlet (23), 30° C. being the air storage temperature. Stream (23) then is air and water from the humidity in the air, condensed during the cooling phases in (202) and/or (302). This condensed water (24) is separated from the stream of compression line (1) in a gas/liquid separator (402) operating at the pressure of stream (23), then sent to a liquid storage (502) at a maintained pressure of 117 bar (11.7 MPa).

The compressed air stream at a pressure of 117 bar (11.7 MPa) and a temperature of 30° C. (25) is then sent to compressed air storage means (1000) until energy recovery phase (2).

When electricity is to be produced, a stream of condensed water (27) from liquid storage (502) at a pressure of 117 bar (11.7 MPa) and a temperature of 30° C. is reinjected into the compressed air stream (26) leaving compressed air storage means (1000) via mixer (600) to form stream (28). Stream (28) is heated in high-pressure heat storage and recovery (202) that releases the heat stored during the compression phase until stream (28) reaches a temperature of 240° C. This hot compressed air stream (29) is expanded in high-pressure turbine (700) producing electricity via a generator, until it reaches at the outlet (30) a pressure of 28 bar (2.8 MPa) and a temperature of 85° C. A condensed water stream (31) from liquid storage (501) at a pressure of 28 bar (2.8 MPa) and a temperature of 50° C. is reinjected into compressed air stream (30) via mixer (601) to form stream (32). Stream (32) is heated in medium-pressure heat storage and recovery (201) that releases the heat stored during the compression phase until stream (33) reaches a temperature of 255° C. This hot compressed air stream (33) is expanded in medium-pressure turbine (701) producing electricity via a generator, until it reaches at the outlet (34) a pressure of 5 bar (0.5 MPa) and a temperature of 70° C. A condensed water stream (35) from liquid storage (500) at a pressure of 6 bar (0.6 MPa) and a temperature of 50° C. is reinjected into compressed air stream (34) via mixer (600) to form stream (36). Stream (36) is heated in low-pressure heat storage and recovery (200) that releases the heat stored during the compression phase until stream (37) reaches a temperature of 245° C. This hot compressed air stream (37) is expanded in low-pressure turbine (702) producing electricity via a generator, until it reaches at the outlet (38) a pressure of 1.02 bar (0.102 MPa) and a temperature of 80° C.

The efficiency of the energy storage process is 70.4% for a 100 MW power consumption of the compressors. The total flow rate of condensed water in the three compression stages is 7.5 t/h. The thermal storage capacity is 93 MWth and the required cooling capacity is 14.6 MWth.

Reinjection of the condensation waters thus allows, by increasing the rate of flow through the turbines in expansion, to improve the process efficiency by nearly 1% in relation to example 1 not according to the invention, and to reduce the required cooling capacity by about 30%.

Example No. 4 According to the Invention

This example implements the system and the method according to the embodiment of the invention illustrated in FIG. 7.

During compression phase (1), a stream of outside air (10), at a pressure of 1.02 bar (0.102 MPa) and a temperature of 27° C., with a humidity of 14.6 g water/kg air, is compressed by a low-pressure compressor (100) which it leaves (11) at a temperature of 255° C. and a pressure of 6 bar (0.6 MPa). This stream (11) is sent to a low-pressure heat storage and recovery (200) that cools the air down to a temperature of 80° C. (12) and stores this thermal energy until expansion phase (2). Stream (12) is cooled again by a cooling (300) to a temperature of 50° C. at the outlet (13). Stream (13) then is air and water from the humidity in the air, condensed during the cooling phases in (200) and/or (300). This condensed water (14) is separated from the stream of compression line (1) in a gas/liquid separator (400) operating at the pressure of stream (13), then it is sent to a liquid storage (500) at a maintained pressure of 6 bar (0.6 MPa). Stream (15), totally gaseous again, is compressed by a medium-pressure compressor (101) which it leaves (16) at a temperature of 275° C. and a pressure of 28 bar (2.8 MPa). Stream (16) is sent to a medium-pressure heat storage and recovery (201) that cools the air down to a temperature of 82° C. (17) and stores this thermal energy until expansion phase (2). Stream (17) is cooled again by a cooling (301) until it reaches a temperature of 50° C. at the outlet (18). Stream (18) then is air and water from the humidity in the air, condensed during the cooling phases in (201) and/or (301). This condensed water (19) is separated from air stream (20) in a gas/liquid separator (401) operating at the pressure of stream (18) and then is sent to a liquid storage (501) at a maintained pressure of 28 bar (2.8 MPa). Stream (20), totally gaseous again, is compressed by a high-pressure compressor (102) from which it flows (21) at a temperature of 250° C. and a pressure of 117 bar (11.7 MPa). Stream (21) is sent to a high-pressure heat storage and recovery (202) that cools the air down to a temperature of 80° C. (22) and stores this thermal energy until expansion phase (2). Stream (22) is again cooled by a cooling (302) until a temperature of 30° C. is reached at the outlet (23), 30° C. being the air storage temperature. Stream (23) then is air and water from the humidity in the air, condensed during the cooling phases in (202) and/or (302). This condensed water (24) is separated from air stream (25) in a gas/liquid separator (402) operating at the pressure of stream (23), then sent to a liquid storage means (502) at a maintained pressure of 117 bar (11.7 MPa).

The compressed air stream at a pressure of 117 bar (11.7 MPa) and a temperature of 30° C. (25) is then sent to compressed air storage (1000) until energy recovery phase (2).

When electricity is to be produced, a condensed water stream (27) from liquid storage (502) at a pressure of 117 bar (11.7 MPa) and a temperature of 30° C. is reinjected into compressed air stream (26) leaving compressed air storage (1000) via mixer (600) to form stream (28). Stream (28) is preheated in an additional heat exchanger (800) so as to reach a temperature of 70° C. at the outlet (29). Stream (29) is then heated in high-pressure heat storage and recovery (202) that releases the heat stored during the compression phase until stream (30) reaches a temperature of 240° C. This hot compressed air stream (30) is expanded in high-pressure turbine (700) producing electricity via a generator, until it reaches a pressure of 28 bar (2.8 MPa) and a temperature of 85° C. at the outlet (31). A condensed water stream (32) from liquid storage (501) at a pressure of 28 bar (2.8 MPa) and a temperature of 50° C. is reinjected into compressed air stream (31) via mixer (601) to form stream 33. Stream (33) is heated in medium-pressure heat storage and recovery (201) that releases the heat stored during the compression phase until stream (34) reaches a temperature of 255° C. This hot compressed air stream (34) is expanded in medium-pressure turbine (701) producing electricity via a generator, until a pressure of 5 bar (0.5 MPa) and a temperature of 70° C. are reached at the outlet (35). A condensed water stream (36) from liquid storage (500) at a pressure of 6 bar (0.6 MPa) and a temperature of 50° C. is reinjected into compressed air stream (35) via mixer (602) to form stream (37). Stream (37) is heated in low-pressure heat storage and recovery (200) that releases the heat stored during the compression phase until stream (38) reaches a temperature of 245° C. This hot compressed air stream (38) is expanded in low-pressure turbine (702) producing electricity via a generator, until a pressure of 1.02 bar (0.102 MPa) and a temperature of 80° C. are reached at the outlet (39).

This stream (39) is then sent to heat exchanger (800) in order to yield its energy to stream (28). The resulting stream (40) leaves the exchanger at 35° C.

The efficiency of the energy storage process is 70.2% for a 100.0 MW power consumption of the compressors. The total flow rate of condensed water in the three compression stages is 7.5 t/h. The thermal storage capacity is 85.7 MWth and the required cooling capacity is 21.8 MWth. This configuration also allows reducing the size of the high-pressure heat storage and recovery by 21% in relation to example 1.

Example No. 5 According to the Invention

This example implements the system and the method according to the embodiment of the invention illustrated in FIG. 8. As in example 3, the operating conditions and the efficiency are determined.

The efficiency of the energy storage system and method is 70.0% for a 100.0 MW power consumption of the compressors. The total flow rate of condensed water in the three compression stages is 7.5 t/h. The thermal storage capacity is 85.7 MWth and the required cooling capacity is 21.8 MWth. This configuration also allows reducing the size of high-pressure heat storage and recovery (202) by 18% and the size of medium-pressure heat storage and recovery (201) by 3% in relation to example 3. This configuration allows reducing the size of high-pressure heat storage and recovery means (202) by 16% in relation to example 1.

Thus, examples 2 to 4 show that the system and the method according to the invention allows increasing the performances of the method while limiting the power required for cooling and, for some embodiments, while limiting the size of the heat storage and recovery.

The invention claimed is:

1. A compressed-gas energy storage and recovery system comprising:
a gas compression line including successive compression stages, each compression stage containing a compressor, a heat storage and a heat recovery system located downstream in a direction of flow of the gas from the compressor, at least one compressed gas storage located at an outlet of the gas compression line for storing gas provided by the gas compressor line, a gas expansion line for expanding the compressed gas stored in the compressed gas storage comprising successive expansion stages, each expansion stage comprising an expansion system and pipes configured to circulate the compressed gas in the heat storage and the heat recovery system for heating the compressed gas; and
the heat storage and the heat recovery system comprises solid heat storage material which remains in the system and each expansion stage comprises a liquid delivery located upstream in the direction of flow of the gas from the heat storage and the heat recovery system; and wherein the heat exchange occurs by direct exchange between the gas and the solid heat storage material.

2. The system as claimed in claim 1, wherein each compression stage comprises a means for separating gas from liquid.

3. The system as claimed in claim 2, wherein the means for separating the gas from liquid is located downstream in the direction of flow from the heat storage and heat recovery system.

4. The system as claimed in claim 2, wherein the heat storage and recovery system comprises liquid storages for storing the liquid from an outlet of the means for separating the gas from the liquid and a means for delivering the liquid to a liquid storage.

5. The system as claimed in claim 1, wherein the gas compression line comprises a number of compression stages which is the same as a number of expansion lines and comprises an expansion stage for each heat storage and recovery system.

6. The system as claimed in claim 5, wherein the compression line and the expansion line comprise three stages.

7. The system as claimed in claim 1, wherein at least one compression stage comprises an air cooler located downstream in a direction of flow of the gas from the at least one compression stage.

8. The system as claimed in claim 1, wherein the expansion line comprises at least one additional heat exchanger located between an outlet of gas from the expansion line and the compressed gas.

9. The system as claimed in claim 8, wherein the at least one additional heat exchanger is located in a first expansion stage.

10. The system as claimed in claim 8, wherein the expansion line comprises two additional heat exchangers respectively located in different expansion stages.

11. The system as claimed in claim 8, wherein the at least one additional heat exchanger is located between a delivery of the liquid and the heat storage and recovery system.

12. The system as claimed in claim 1, wherein the solid heat storage material comprises particles selected from one of stones, concrete, gravel, and phase change material (PCM) balls.

13. A compressed-gas energy storage and recovery method comprising:
   a) compressing at least twice successively gas in a compression line including two compression stages with each compression stage performing at least one compression of the gas;
   b) recovering heat from the compressed gas in at least one heat storage and recovery system after each compression of the gas; and
   c) storing the cooled compressed gas in at least one compressed gas storage, the compressed gas leaving the at least one compressed gas storage in an expansion line, the expansion line comprises at least two successive expansion stages wherein in each expansion stage the compressed gas is heated by circulation in the at least one heat storage and recovery system by using heat stored during the compression and thereafter the heated compressed gas is expanded in an expansion device and the heat is stored by using solid heat storage material which remains in the system and before each expansion step the liquid is fed into the compressed gas prior to heating the gas with heat exchange occurring by direct exchange between the gas and the solid heat storage material.

14. The method as claimed in claim 13, wherein after each compression step gas and liquid present in the gas are separated.

15. The method as claimed in claim 14, wherein separated liquid is stored and fed into the compressed gas.

16. The method as claimed in claim 13, wherein a number of compressions is equal to a number of expansions and the storage and recovering of the heat in step b) is used for heating compressed gas in each expansion.

17. The method as claimed in claim 13, wherein after each heat recovery, the compressed gas at an outlet of the at least one heat storage and heat recovery further is cooled prior to transmission of the gas to a subsequent compression of the gas or to the at least one compressed gas storage.

18. The method as claimed in claim 13, wherein, prior to at least one expansion, the gas is heated by at least one additional heat exchanger by using gas from an outlet of the expansion line.

19. The method as claimed in claim 18, wherein the at least one additional heat exchanger is used for a first expansion step in a direction of flow of the gas.

20. The method as claimed in claim 18, performing two additional heat exchanges in two successive expansions of the gas.

21. The method as claimed in claim 20, comprising performing two additional heat exchangers after feeding the stored liquid into the compressed gas.

22. The compressed-gas energy storage and recovery method as claimed in claim 13, wherein the solid heat storage material comprises particles selected from one of stones, concrete, gravel, and phase change material (PCM) balls.

23. A compressed-gas energy storage and recovery method performed in a compressed-gas energy storage and recovery system comprising the steps of:
   in an energy storage phase:
   a) successively compressing at least twice a gas in a compression line comprising at least two compression stages with each compression stage comprising at least one compression means;
   b) after each compression step, recovering the heat of the compressed gas in at least one heat storage and recovery means including solid heat storage material which remains in the system with heat exchange occurring by direct exchange between the gas and a solid heat storage material;
   c) storing the cooled compressed gas in at least one compressed gas storage means; and
   in an energy recovery phase:
   d) circulating the compressed gas leaving the at least one compressed gas storage and means in an expansion line comprising at least two successive expansion stages, and in each expansion stage, heating the compressed gas by circulating the gas in one of the heat storage and recovery means using heat stored during the compression step and then expanding the heated compressed gas in an expansion means, and wherein;
   the heat is stored in the solid heat storage material which remains in the system, and before each expansion step, a liquid is fed into the compressed gas prior to the step of heating the gas.

24. The system as claimed in claim 22, wherein the solid heat storage material comprises particles selected from one of stones, concrete, gravel, and phase change material (PCM) balls.

* * * * *